Figure 1:
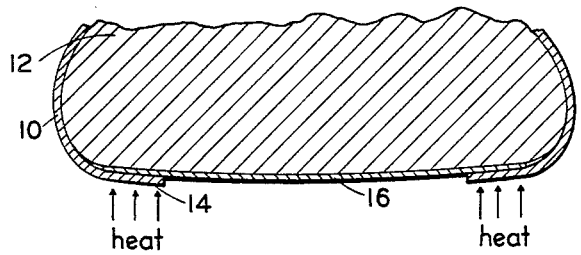

June 14, 1960     M. S. BROMFIELD     2,940,096
METHOD OF MAKING SHOES EMPLOYING HEAT
Filed June 25, 1957

INVENTOR.
MORTON S. BROMFIELD
BY
GEORGE L. GREENFIELD
ATTORNEY

2,940,096
METHOD OF MAKING SHOES EMPLOYING HEAT

Morton S. Bromfield, 8 Hubbard St., Canton, Mass.

Filed June 25, 1957, Ser. No. 667,988

3 Claims. (Cl. 12—142)

This invention relates to the art of shoemaking and more particularly comprises a new and improved method of attaching a sole to an upper. My invention, although applicable to the manufacture of all types of shoes having cemented soles, is particularly beneficial when practiced in the manufacture of shoes having high shanks.

The method of manufacturing shoes invented by applicant and the many advantages inherent in its practice may best be appreciated by comparing it with the manufacturing method in practice today. In the conventional method of manufacturing shoes having cemented soles, after the upper is formed on the last, a coating of cement is applied to its periphery or bottom. In the manufacture of high shank shoes it is then necessary to allow two or more hours for the cement to set and dry. The actual time required for the cement to set is determined by the particular material from which the upper is made. While cement applied to a leather upper may require approximately two hours to set up, setting of the same kind of cement on a vinyl upper may require twelve hours or more.

After the cement has set on the upper, the sole, which previously has received a coating of cement, is put in an oven to heat activate its coating. Although the application of heat is the most common method of activating the cement, it is also common practice to expose the sole to water vapor or apply the solvent of the cement to the coating to accomplish the same purpose. Next, the sole is applied to the upper and the shoe is put in a press for ten to thirty seconds to aid in the formation of a proper bond between the sole and upper. It is particularly difficult to attach soles to high shank shoes because the sole must be made to conform to the irregular contour of the arch which prestresses the bond between the upper and sole.

There are a number of disadvantages associated with the conventional method of shoe manufacture described in the preceding paragraphs. One important disadvantage incident to the conventional process is that following the removal of the shoe from the press, it is possible to peel the sole from the upper because approximately twenty-four hours are required after the shoe has been removed from the press for the cement to attain maximum strength. During this long time interval, if less than the proper amount of cement has been applied, or if insufficient set-up time before sole laying has been allowed, or insufficient activation of sole cement has taken place, the sole may work away from the upper requiring disassembling of the shoe; worse still, if the separation is unnoticed, the ultimate wearing of the shoe will cause the weakly bonded sole to separate.

Another disadvantage resulting from the use of the conventional method is that the sequence of steps do not lend themselves to automation. As has been suggested, shoes made of different materials cannot be treated uniformly for each material requires special handling. For example, while only two hours may be required for cement to set on a leather upper, twelve hours may be required for the cement to set on an upper made of vinyl. Furthermore, the time required for drying of the upper is determined by the particular material used in the construction of the upper.

Another disadvantage resulting from the practice of the conventional process is that a tremendously large number of lasts are essential in even a small shoe manufacturing operation. It is common knowledge that the cost of lasts represents the largest indirect cost in shoe making and more money is invested in lasts than in any capital equipment items, buildings, machinery or other property incident to the manufacture of shoes. Problems are also created in the conventional process by the application to the upper of non-uniform or excessively thick layers of cement because the setting of the cement will not be uniform from shoe to shoe or within various areas of a given shoe.

The primary object of my invention is to eliminate the many disadvantages enumerated above which are incident to the manufacture of shoes and, particularly, high shank shoes.

This and other objects of my invention will be better understood and appreciated from the following detailed description, read in connection with the accompanying drawings, in which:

Figures 1–6 are fragmentary views illustrating the various steps in the sole laying operation practiced in accordance with my invention.

In the practice of my invention, the shoe upper 10 is assembled on the last 12 in the customary manner. That is, the upper is spread over the last and its periphery or bottom 14 is either tacked or cemented (not shown) to the insole 16 which has previously been secured to the last. Thereafter, as customary, the overlasted margin 14 of the upper is roughed by a wire brush to prepare it for the application of a coating of cement and the steel shank (not shown) is stapled or secured by other means to the insole.

The first step in my method, which constitutes a radical departure from the prior art, is the preheating of the overlasted margin of the upper 14 before any cement is applied to the bottom or periphery. This preheating may be done in an infra red oven having a temperature of approximately 250° F. to 300° F. for about two minutes. A high shank lasted upper heated in that manner will have approximate temperatures of 200° F. at the ball, 155° F. at the shank, 155° F. at the forepart and 140° F. at the toe. It is to be understood that any type of heat source can be used and the intensity of the heat in the oven will determine the duration necessary to heat the shoe to the approximate temperatures set forth above. This application of heat develops a heat reservoir in the overlasted margin of the upper for purposes which will become clear below.

Figure 2:
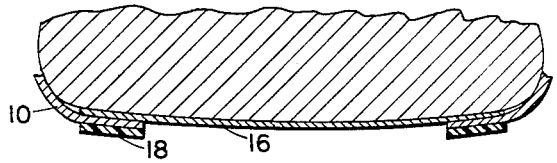
Figure 3:
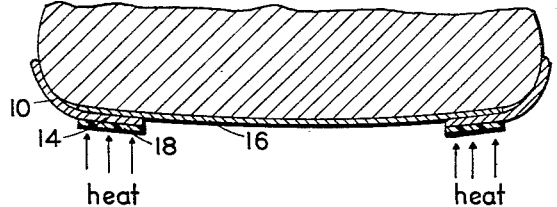
Figure 4:
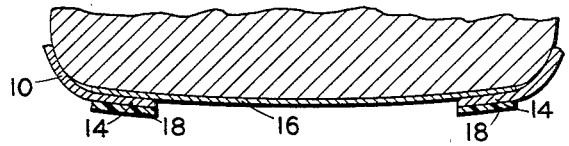

After preheating, the overlasted margin of the upper is coated with cement 18 as suggested in Figure 2, which may be of any of the standard varieties now commonly used; for example, thermoplastic adhesives such as Hycar cement, neoprene, reclaimed rubber cement and animal and vegetable glues. After the cement 18 has been coated on the periphery of the upper, additional heat is directed to the exposed surface of the cement as suggested in Figure 3. This additional heat cooperates with the heat reservoir to condition the cement by evaporating the solvent in the cement and causing partial setting or hardening. The reheat oven used to supply the additional heat may also have an infra red heat source and its temperature may be approximately 225° F. to 240° F. An overlasted upper subjected to additional heat in such an oven for approximately two minutes will have approximate temperatures of 200° F. at the ball, 180° F. at the shank, 165° F. at the fore part and 145° F. at the toe. After the exposed surface of the cement has been heated, the last with the upper is removed from the oven and allowed to cool at room temperature for a period of approximately two minutes to permit complete setting or hardening of the cement. This cooling step is suggested in Figure 4.

With regard to the temperatures of the upper resulting from preheating and reheating, those temperatures listed above were determined by actual tests on dark colored shoes. Similar tests on light colored shoes revealed that the temperatures are approximately 10° less when subjected to the given oven temperatures for about two minutes. The variations in temperatures over the bottom of the shoe were caused by the irregularity of the bottom surface. Because of their irregular nature, the various portions of the bottoms did not lie at equal distances from the heat source. Although the oven temperatures and heating times set forth above appear to be optimum, the desired results will be accomplished just so long as the overlasted margin of the upper 14 is preheated and reheated to minimum temperatures of 120° F. and 130° F. respectively. Maximum shoe temperatures are only limited by the amount of heat which will scorch the overlasted upper. It should also be noted that the temperature requirements in my process may be varied by preheating the cement before it is applied to the upper or by varying the solid to solvent ratio of the cement or glue.

Figure 5:
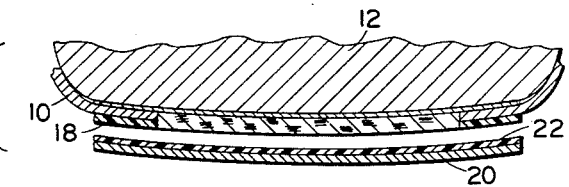
Figure 6:
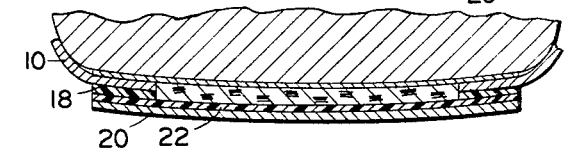

After the upper 10 has been heated in the foregoing manner, it is only necessary to activate either the cement previously applied to the sole or the cement 18 on the upper before positioning the sole on the upper. In Figure 5 I have illustrated a sole 20 having a coating of cement 22 applied to one surface thereof and the sole is juxtaposed to the upper 10. The cement on either the sole 20 or the upper 10 may be activated in a number of ways such as by heating, exposing to water vapor or applying a solvent. Because the cement 18 applied to the upper passes through a tacky or "active" state after it is removed from the reheat oven and before it hardens, with proper control of the cooling it is possible to apply the sole 20 to the upper 10 without re-activating the cement on either the sole or the upper. Regardless of the manner in which the cement on either the upper or the sole is activated, the next step is to coalign the sole 20 and the upper 10 and thereafter insert the upper with the sole in a press (not shown). The shoe may be removed from the press after approximately five to fifteen seconds as in the conventional method now practiced in the art. However, while the shoe is in the press this very short time, the cement achieves much of its maximum strength and any attempt to peel the sole from the upper shortly after the shoe is removed from the press will usually result in tearing of the upper or sole. In Figure 6 I have illustrated a portion of the completed shoe with the sole 20 secured to the bottom of the upper.

From the foregoing description, those skilled in the art will appreciate that the disadvantages of the conventional method alluded to above are overcome by practicing my new method. As indicated, the cement acquires substantially maximum strength shortly after attachment of the sole. Moreover, a heat balance is achieved for all shoe materials in that no special attention must be given to the particular material used in the upper or the sole. The times and temperatures given above apply equally to all materials such as leather, linen, reptile and vinyl uppers and leather, rubber and plastic soles. Thus, uniformity of operation is achieved and automatic conveyors and similar machines may be used to advantage in the practice of my invention.

It will also be noted from the foregoing description that there is no appreciable consumption of time in the setting of the cement on the upper in the practice of my method whereas from two hours to overnight is required for complete setting of the cement in the conventional process. Undoubtedly this great time saving is at least in part achieved by the direct application of heat to both the lower and upper surfaces of the cement coating on the upper. The preheated overlasted margin radiates its heat to the underside of the coating while the external heat from the reheat oven is applied to its outer surface. Thus, the solvent evaporation is greatly accelerated before the cement surface in contact with the air forms the usual glaze film that greatly inhibits the solvent evaporation. It should be noted particularly that only four minutes elapse between the application of the cement to the upper and the laying of the sole.

My invention also eliminates the need for careful control of the thickness of the cement coating deposited. The greatly accelerated cement set-up in my process treats the irregularly deposited heavy coatings. Furthermore, my process, in driving off the moisture which is present to a lesser or greater amount in the pores of a leather upper, depending on material, factory humidity and pretreatment, provides a uniformly dry surface which can properly absorb the cement. Thus, my process insures uniformly maximum bond strength with the body of the upper material. The tremendous time saving features of my invention also result in a substantial reduction of overhead in the manufacture of shoes. While in the manufacture of high shank shoes under conventional methods approximately one day is required for shoes to complete the manufacturing making cycle, the cycle is reduced to fifteen minutes or less by the use of my method. Thus, the manufacturer's inventory of lasts may be reduced by at least two-thirds when my method replaces the conventional methods of today.

I have also discovered that the preheating step in my method provides additional benefits in the manufacture of shoes having uppers made of non-porous materials such as vinyl or relatively non-porous materials. With an upper made of such material it is possible to apply the previously cement coated sole to the upper immediately after preheating and without the application of a coating of cement to the bottom of the upper for the preheating conditions the upper to receive the sole and may activate the cement on the sole. Thus the preheating in certain instances may eliminate the necessity for applying a coating of cement to the upper. The advantages of this method are obvious. The expensive and time consuming operations of applying the cement to the periphery of the upper and the cleaning of the upper after attaching the sole are eliminated. Furthermore, there is no cement on the upper which could adversely affect its finish.

From the foregoing description those skilled in the art will appreciate that numerous modifications may be made of my invention without departing from its spirit. Therefore, I do not intend to limit the breadth of my invention to the details of the method described above but rather it is my intention that the scope of my invention be determined by the appended claims and their equivalents. For example, although the specification refers to preheating and reheating of the upper, it is only necessary that this heat be applied to the particular portion of the upper to which the cement is to be applied.

What I claim as new and desire to secure by Letters Patent of the United States is:

1. A method of making shoes comprising the steps of providing an overlasted upper, preheating the overlasted margin of the upper to develop a heat reservoir, applying a coating of thermoplastic adhesive to the heated overlasted margin, applying additional heat to the exposed surface of the adhesive coating, said heat reservoir and additional heat cooperating to set up the adhesive, providing a sole having a coating of adhesive, at least one of the two coatings of adhesive being in an active state, and coaligning the sole with the overlasted margin of the upper to bond them together.

2. A method of making shoes including the steps of lasting an upper upon a last, heating the overlasted margin of the upper to develop a heat reservoir in said overlasted margin, applying heat conditionable adhesive to the surface of the heated overlasted margin, applying additional heat to the exposed surface of the adhesive before the heat of the reservoir is dissipated whereby said adhesive is rapidly conditioned by the simultaneous action of the applied heat and the heat from said reservoir, and thereafter pressing a sole upon said overlasted margin.

3. A method of making shoes including the steps of providing a sole element, providing a lasted shoe element having an overlasted margin, heating one surface of one of said elements to develop a heat reservoir in said element, applying a coating of heat conditionable adhesive upon the heated surface, applying additional heat upon the exposed surface of the adhesive before the heat of the reservoir is dissipated whereby said adhesive is rapidly conditioned by the simultaneous action of the applied heat and the heat from said reservoir, and thereafter pressing the sole element on the overlasted margin.

References Cited in the file of this patent

UNITED STATES PATENTS

| | | |
|---|---|---|
| 1,919,464 | Daniels | July 25, 1933 |
| 1,951,474 | Eastman | Mar. 20, 1934 |
| 1,967,337 | Tetlow | July 24, 1934 |
| 1,998,505 | Johnson | Apr. 23, 1935 |
| 2,294,481 | Ryan | Sept. 1, 1942 |
| 2,395,133 | Mahoney et al. | Feb. 19, 1946 |